July 31, 1951  L. A. KEMPTON  2,562,315
DIAPHRAGM VALVE
Filed June 29, 1946
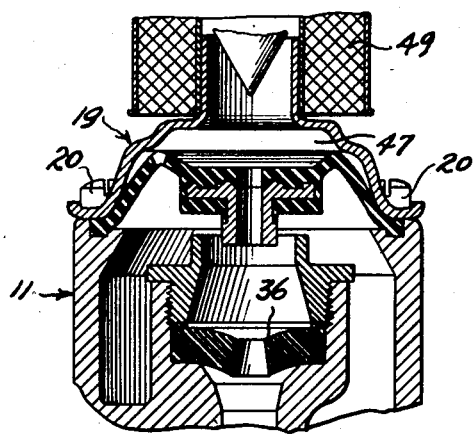
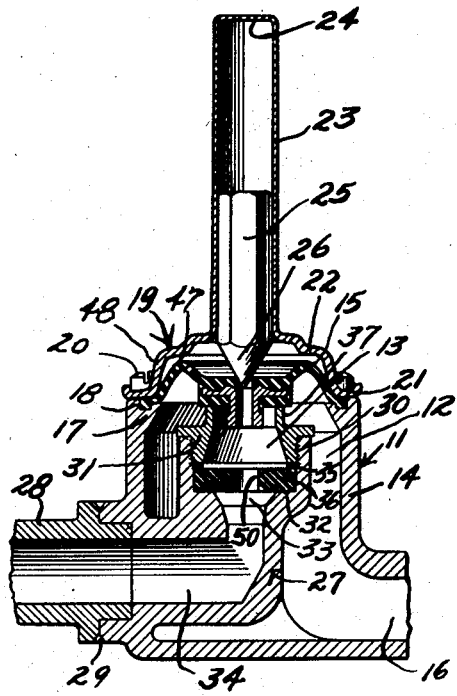
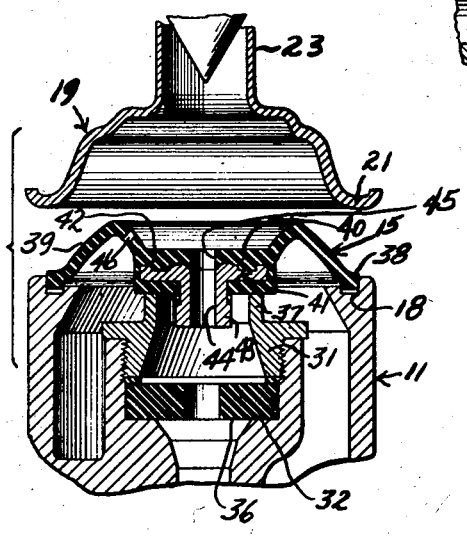
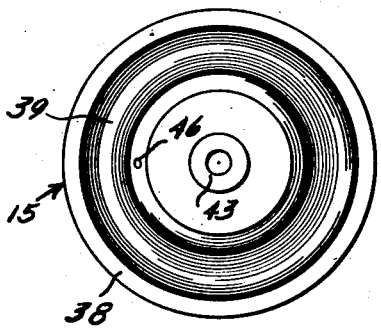
INVENTOR.
LESLIE A. KEMPTON
BY
ATTYS.

Patented July 31, 1951

2,562,315

UNITED STATES PATENT OFFICE 2,562,315

DIAPHRAGM VALVE

Leslie A. Kempton, Chicago, Ill., assignor to The Dole Valve Company, Chicago, Ill., a corporation of New York Application June 29, 1946, Serial No. 680,421

4 Claims. (Cl. 137—139)

This invention relates to a diaphragm valve and more particularly, to a diaphragm valve of the so-called pilot operated or pilot controlled type.

One type of diaphragm valve which has been employed in the past utilizes a fluid inlet and outlet chamber on the same side of a valve diaphragm, the chambers being in substantially concentric relationship, and in which fluid is bled from the inlet side through the diaphragm to a third chamber on the opposite side of the valve diaphragm. When fluid is retained in this third chamber, the valve diaphragm closes the outlet port or outlet chamber, and the diaphragm is maintained in this closed position by the fluid itself. The diaphragm is opened by dumping fluid from this third chamber into the outlet chamber at a more rapid rate than it can be taken into the third chamber from the inlet chamber. This reverses the pressure balance and causes the valve diaphragm to open.

In the past, it has been necessary to provide ribs or other spacing means either on the casing which, together with the valve diaphragm forms the third chamber, or else to provide ribs or spacing means on the diaphragm itself.

One of the principal features and objects of the present invention is to provide a novel valve construction in which the necessity for such ribs or spacing means is eliminated, and which provides a greatly simplified construction.

A further object of the present invention is to provide a novel diaphragm valve which is economical to manufacture and which is reliable and rugged in use.

A further object of the present invention is to provide a novel valve diaphragm for a pilot operated diaphragm valve.

A still further object of the present invention is to provide a novel location and arrangement of a bleeder hole in a valve diaphragm of a valve as hereinbefore referred to.

Another and further object of the present invention is to provide a novel combination valve diaphragm and valve casing sealing means or gasket.

Another and still further object of the present invention is to provide a novel method and means for assembling a valve diaphragm in a valve construction.

The novel features which I believe to be characteristic of my invention are set forth with particularity in the appended claims. My invention itself, however, both as to its manner of construction and method of control together with further objects and advantages, may best be understood by reference to the following description, taken in conjunction with the accompanying drawing, in which:

Figure 1 is a vertical sectional view of a pilot operated diaphragm valve with the solenoid removed;

Figure 2 is a fragmentary vertical sectional view of the valve shown in Figure 1, but with the valve in its open position with the solenoid diagrammatically shown therein;

Figure 3 is a bottom view of the valve diaphragm; and

Figure 4 is a fragmentary vertical sectional view similar to Figure 2 but showing the valve diaphragm and upper cap member in the process of being assembled.

The pilot operated diaphragm valve illustrated in the various figures of the drawing includes a casting or housing 11 having an inlet chamber 12 which is concentric with an outlet chamber 13. The inlet chamber 12 is formed by the outer wall portion 14 of the casting 11 and by the valve diaphragm 15. An inlet duct or passageway 16 communicates with the inlet chamber 12.

The upper edge of the casing wall 14 is provided with a shoulder or inturned flange 17 having an upwardly facing channel or groove 18 formed therein. Mounted on top of this casting 11 is a cap member 19 which is bolted or otherwise suitably secured as at 20 to the shoulder 17. The cap 19 includes a flange portion 21, an intermediate shoulder portion 22 and a long tubular portion 23 which is closed by an end wall 24 at its upper end. The tubular portion 23 is provided with a pilot member 25 which slides freely therein and is formed of some suitable magnetizable material such as iron or steel. The pilot member 25 has a pointed or tapered lower end 26 which cooperates with the valve diaphragm 15 in a manner presently to be described.

The outlet chamber and passageway of the valve construction includes an inner elbow 27 which is formed as a part of the casting 11 and which communicates at its lower end with an outlet member 28 which is welded or otherwise suitably secured as at 29 to the casting 11. The upstanding portion of the elbow 27 is provided with an interiorly threaded upper end 30 into which a valve seat member 31 is threaded. Below this threaded portion 30 of the elbow 27 is a shoulder 32 which extends radially outwardly from a double frusto-conical portion 33 leading to the outlet passageway 34 which communicates with the outlet member 28.

A small clamping ring 35 may be interposed between the flow washer 36 and the valve seat member 31 whereby the valve seat member 31 holds the flow washer 36 in place on the shoulder 32.

The valve seat member 31 includes an upstanding collar portion 37 which provides the valve seat proper against which the diaphragm 15 is seated to close off the outlet from the inlet.

The valve diaphragm 15 may be seen best in Figures 2, 3 and 4 of the drawing. This valve diaphragm 15 is preferably formed of rubber or some other suitable resilient material and includes a slightly thickened outer edge 38, an annular flexing portion 39 and a reinforced central portion 40. The reinforced central portion 40 has a metal insert member 41 which includes a flat disk-like base part 42 and a downwardly extending tail portion 43 having a central bore or passageway 44 therein which is contiguous with a bore or passageway 45 in the diaphragm 15. This reinforced central portion 40 of the diaphragm 15 has the base portion 42 of the metal insert 41 embedded therein and is arranged to be seated on the valve seat or collar 37 with the tail portion 43 extending down into the chamber portion 13 formed by the valve seat member 31 above the flow washer 36.

In addition to the central opening 44, 45 in the diaphragm valve 15, there is also provided bleeder hole 46 in the annular portion 39 of the diaphragm 15. It will be observed that the annular portion 39 of the diaphragm 15 is hump-shaped in transverse cross-section, and as the diaphragm is raised from its position as shown in Figure 1 of the drawing to its position as shown in Figure 2 of the drawing, the hump-shaped portion unfolds somewhat to enable the reinforced central portion 40 to be raised by locating the bleeder hole 46 slightly inwardly of the top 47 of the hump. When the reinforced central portion 40 is in seated engagement on the valve seat 37 and by properly positioning it from the outer edge of the diaphragm 15, it will be seen that as the hump unfolds and as the central portion 40 rises, the hole moves up until it is exactly at the top of the hump when the diaphragm strikes the shoulder 22 in the cup member 19.

By so doing, all of the fluid may be dumped out of the chamber portion 47 which lies above the diaphragm 15 by virtue of the fact that the passageway 44, 45 is substantially greater in cross-sectional area than the bleeder hole 46. It further prevents any fluid from being locked in the region between the flange portion 48 of the cap member 19 and the diaphragm 15.

It has always been necessary in the past to provide ribs on either the shoulder 22 or on the diaphragm 15 or some other suitable spacing means to enable all of the fluid above the diaphragm 15 to pass out through the passageway 44, 45, including the portion of fluid which would otherwise be trapped between the flange portion 48 of the cap 19 and the diaphragm 15. The need for such spacing means is eliminated entirely by providing a bleeder hole located in precisely the manner specified above, where it will be noted that in its upper position, the hole lies partly on one side of the top 47 of the hump and partly on the other side. This means that fluid can pass from one side of the hump to the other through the upper portion of the hole, since the upper end of the hole does not lie in a single plane. In other words, due to the fact that there is a crease in the diaphragm through the center of the bleeder hole 46, when the diaphragm 15 is in its upper position, fluid may pass freely from the region between the flange 48 of the cap 19 and the diaphragm 15 into the chamber 47 and then out through the passageway 44, 45.

As may be seen from an inspection of Figures 1 and 2 of the drawing, when the pilot member 25 is in its lower position so that the tapered end 26 of the pilot 25 closes the hole 45 in the diaphragm 15, fluid under pressure from the inlet 16 will pass through the bleeder hole 46 into the upper chamber 47. Since the fluid under pressure on the upper side of the diaphragm 15 acts over the whole area of the diaphragm, while it only acts over the annular portion 39 on the underside, the fluid pressure itself keeps the diaphragm 15 in its closed position.

If the solenoid 49 which is mounted on the tubular portion 23 is energized, the pilot 25 is lifted up to the top of the tubular portion 23, thus opening the passageway 44, 45. Since this passageway 44, 45 is much larger than the bleeder hole 46, fluid flows out of the chamber 47 faster than it can come in, and the pressure on the upper side of the diaphragm 15 is relieved. The fluid acting against the underside of the diaphragm 15 over the annular portion 39 thus lifts the diaphragm 15 off of the valve seat 37 and raises it to the position as shown in Figure 2. Fluid under pressure thus passes freely from the inlet passageway 16 over the valve seat 37 into the chamber 13 and down and out through the outlet member 28.

As hereinbefore indicated, a flow washer 36 is provided in the outlet passageway on the shoulder 32. This flow washer is made of rubber or other suitable resilient material and is provided with an opening 50 therein. The opening 50 is substantially smaller in diameter than the diameter of the inner edge of the shoulder 32 so that the flow washer 36 flexes under fluid pressure in the manner shown in Figure 2, thus reducing the size of the orifice opening in the flow washer 36 through which the fluid passes. The greater the pressure, the smaller will be the cross-sectional opening of the upper end of the hole 50 in the washer 36.

It has been found that by properly proportioning the relative size of the opening 50 with respect to the inner edge of the shoulder 32 substantially uniform flow rate may be maintained over a wide range of fluid pressures.

As will be seen best in Figures 2 and 4 of the drawing, the valve diaphragm serves not only as the valve member but also as a gasket for making a fluid-tight seal between the cap 19 and the housing or casting 11. The outer enlarged marginal portion 38 of the diaphragm 15 makes an interlocking seated engagement in the annular groove 18. As the flange portion 21 on the cap member 19 is screwed down into place by the bolts 20, the enlarged portion 38 is squeezed tightly into the groove 18 and provides an extremely fine sealing connection between the cap 19 and the housing 11.

While I have shown a particular embodiment of my invention, it will, of course, be understood that I do not wish to be limited thereto, since many modifications may be made, and I, therefore, contemplate by the appended claims to cover all such modifications that fall within the true spirit and scope of my invention.

I claim as my invention:

1. A valve diaphragm having a relatively stiff central portion with an orifice therein, a flexible annular portion surrounding said central portion and an outer marginal portion, said flexible portion having a hump therein in a transverse radial section and having a bleeder hole in said hump, so arranged that it will be spaced radially inwardly of the top of the said hump when said diaphragm is in a normal unstressed condition and will move outwardly to exactly the top of said hump when said diaphragm is at its maximum extended stressed condition.

2. A valve including a valve diaphragm having a relatively stiff central portion, a flexible annular portion surrounding said central portion and an outer portion, means for securing and holding said outer portion to support said diaphragm in operating position within said valve including a valve casing forming a chamber on one side of said diaphragm and a cap member closing and forming a chamber on the opposite side of said diaphragm, said flexible portion of said diaphragm having a hump therein in transverse section and seating against the inside wall of said cap member when said diaphragm is in an extended position, and having a bleeder hole in said hump so arranged that it will be located inwardly of the top of said hump when said diaphragm is in a closed position and will move to exactly the top of said hump when said diaphragm is in its maximum open position.

3. A valve including a valve diaphragm having a relatively stiff central portion, a flexible annular portion surrounding said central portion and an outer portion, means for securing and holding said outer portion to support said diaphragm in operating position within said valve including a cap member closing the top of said diaphragm, said flexible portion of said diaphragm having a hump therein in transverse section and seating against an inner wall portion of said cap member when said diaphragm is in an extended position, and said diaphragm having a bleeder hole in said hump, said bleeder hole being so arranged that it will be located radially inwardly of the top of said hump when said diaphragm is in a closed position and will move outwardly to exactly the top of said hump when said diaphragm is in its maximum open position, said central portion having an orifice therethrough, and a pilot movable to open and close said orifice.

4. A fluid control unit for controlling the passage of fluid therethrough comprising a housing, a flexible diaphragm extending across the interior of said housing and dividing said housing into a first and a second chamber, said housing having a fluid inlet duct communicating with said first chamber, an outlet pipe extending from the wall of said housing and projecting into said first chamber, the inner end of said pipe being disposed in close proximity to a central portion of said diaphragm and arranged to be closed off by the same, said second chamber having a wall portion against which the diaphragm seats when in an extended position, said diaphragm having a flexible region surrounding said central portion, said flexible region having a hump therein in transverse section and a bleeder hole in said hump so arranged that it will be located inwardly of the top of said hump when said diaphragm is heated against the inner end of said pipe and will move outwardly to the top of said hump when said diaphragm is in its extended position and said hump is seated against a wall portion of said second chamber, said bleeder hole forming a communicating passage between said first and second chambers, said diaphragm having an opening through its central portion over the end of said pipe, and means for opening and closing said center opening in said diaphragm to control opening and closing of the end of said pipe by said diaphragm.

LESLIE A. KEMPTON.

REFERENCES CITED

The following references are of record in the file of this patent:

UNITED STATES PATENTS

| Number | Name | Date |
| --- | --- | --- |
| 2,175,460 | Guildford | Oct. 10, 1939 |
| 2,212,607 | Langdon | Aug. 27, 1940 |
| 2,305,151 | Fields | Dec. 15, 1942 |